(12) United States Patent
Pegg

(10) Patent No.: US 10,337,615 B2
(45) Date of Patent: Jul. 2, 2019

(54) MACHINE WITH REDUCED CYLINDER FRICTION

(71) Applicant: Ford Global Technologies, LLC, Dearborn, MI (US)

(72) Inventor: Ian Graham Pegg, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 15/196,587

(22) Filed: Jun. 29, 2016

(65) Prior Publication Data

US 2017/0009888 A1 Jan. 12, 2017

(30) Foreign Application Priority Data

Jul. 10, 2015 (GB) .................................. 1512124.7

(51) Int. Cl.
*F16J 10/02* (2006.01)
*F02F 1/20* (2006.01)
(Continued)

(52) U.S. Cl.
CPC ............... *F16J 10/02* (2013.01); *F02F 1/004* (2013.01); *F02F 1/20* (2013.01); *F04B 39/122* (2013.01);
(Continued)

(58) Field of Classification Search
CPC ........ F16J 10/02; F16J 1/08; F16J 9/12; F16J 10/04; F02F 1/20; F02F 1/004; F04B 39/126; F04B 39/122
See application file for complete search history.

(56) References Cited

U.S. PATENT DOCUMENTS 7,267,045 B2 * 9/2007 Leweux ................... F02F 1/20
384/293
7,685,991 B2 * 3/2010 Cumming ................ F02F 1/20
123/305
(Continued)

FOREIGN PATENT DOCUMENTS

CN 204627772 U 9/2015
DE 10360148 A1 7/2005
(Continued)

OTHER PUBLICATIONS

Intellectual Property Office of the United Kingdom, Combined Search and Examination Report of GB1512124.7, dated Jan. 8, 2016, 6 pages.
(Continued)

*Primary Examiner* — Thomas E Lazo
*Assistant Examiner* — Abiy Teka
(74) *Attorney, Agent, or Firm* — Julia Voutyras McCoy Russell LLP

(57) ABSTRACT

A machine having one or more cylinders, each cylinder having an inner surface configured to engage a circumferential surface of a piston ring of a piston thereby defining a contact zone between the inner surface of the cylinder and the circumferential surface of the piston ring, the inner surface having at least one recess indented into the inner surface, wherein the ratio of the dimension of the recess in the direction of travel of the piston to the dimension of the contact zone in the direction of travel of the piston is in the range of approximately 1:5 to 3:5.

20 Claims, 8 Drawing Sheets

(51) Int. Cl.
*F16J 10/04* (2006.01)
*F02F 1/00* (2006.01)
*F04B 39/12* (2006.01)
*F16J 1/08* (2006.01)
*F16J 9/12* (2006.01)

(52) U.S. Cl.
CPC ............... *F04B 39/126* (2013.01); *F16J 1/08* (2013.01); *F16J 9/12* (2013.01); *F16J 10/04* (2013.01)

(56) References Cited

U.S. PATENT DOCUMENTS

| | | | |
|---|---|---|---|
| 9,482,153 B2* | 11/2016 | Bethel | F02B 75/282 |
| 2003/0021711 A1* | 1/2003 | Klink | B23H 9/008 |
| | | | 417/572 |
| 2012/0132069 A1* | 5/2012 | Roh | F02F 1/20 |
| | | | 92/153 |
| 2014/0345453 A1 | 11/2014 | Oh et al. | |

FOREIGN PATENT DOCUMENTS

| | | |
|---|---|---|
| EP | 1818530 A1 | 8/2007 |
| JP | 2007002989 A | 1/2007 |
| JP | 2007132247 A | 5/2007 |
| JP | 2008019718 A | 1/2008 |
| JP | 2010255847 A | 11/2010 |

OTHER PUBLICATIONS

Pegg, Ian Graham, "Piston Ring Configured to Reduce Friction," U.S. Appl. No. 15/194,151, filed Jun. 27, 2016, 32 pages.
Pegg, Ian Graham, "Bearing Interface with Recesses to Reduce Friction," U.S. Appl. No. 15/195,796, filed Jun. 28, 2016, 31 pages.
ISA European Patent Office, Search Report of EP16178141.4, dated Nov. 8, 2016, Germany, 8 pages.

* cited by examiner

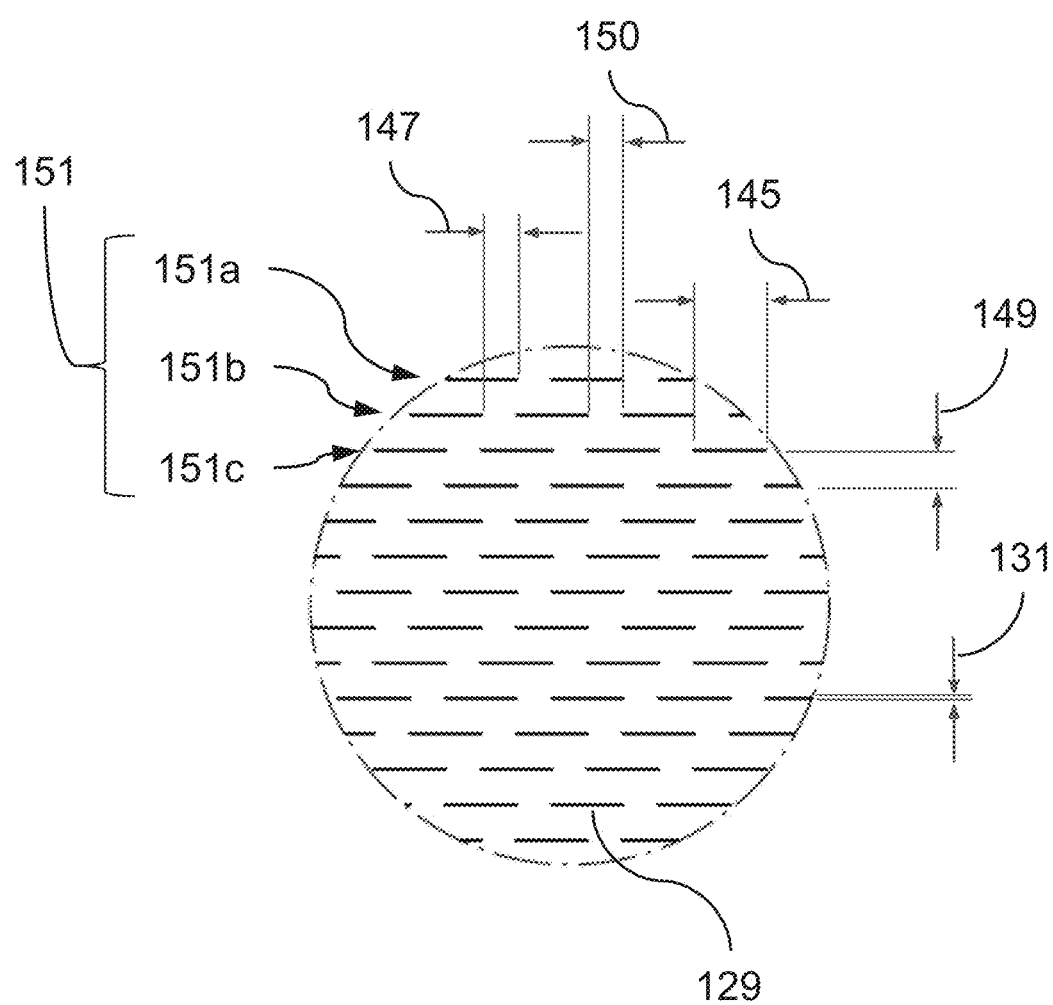

MACHINE WITH REDUCED CYLINDER FRICTION

CROSS REFERENCE TO RELATED APPLICATION

This application claims priority to Great Britain Patent Application No. 1512124.7, filed Jul. 10, 2015, the entire contents of which are hereby incorporated by reference for all purposes.

FIELD

This disclosure relates to a machine, such as a linear actuator or a rotary machine, having one or more cylinders each having an inner surface comprising a plurality of recesses indented into the inner surface, and in particular relates to an inner surface of a cylinder having a plurality of recesses provided only in predetermined regions of the cylinder bore.

The term "rotary machine" is intended to encompass reciprocating machines such as internal combustion engines, compressors and vacuum pumps, as well as machines with rotating components but no reciprocating parts.

INTRODUCTION

An internal combustion engine typically has one or more reciprocating pistons which are lubricated to reduce the friction as the piston slides within a cylinder bore. Lubricated sliding contacts, such as between the piston rings of a piston and an inner surface of the cylinder bore, have frictional losses due to the shear forces generated in the lubricant, contact between surface asperities, and boundary contacts caused by additives in the lubricant.

It is desirable to reduce the friction between the piston rings and the inner surface of the cylinder in order to increase the efficiency of the engine and reduce wear between engine components. The friction between the components may be determined by a number of factors, which include the operational parameters of the engine and the configuration of each of the sliding surfaces. For example, the frictional coefficient between sliding components may be determined using the Stribeck curve, which is used to categorize the frictional properties between two surfaces as a function of the viscosity of the lubricant and the relative speed between the components per unit load. As such, friction may be minimized by operating at the minimum point on the Stribeck curve, which defines the transition between hydrodynamic lubrication and mixed lubrication. However, it is difficult to maintain operation at the minimum point on the Stribeck curve across the full piston stroke as a result of the low relative speed between the piston and the cylinder at the extremes of the range of movement of the piston.

STATEMENTS OF INVENTION

According to an aspect of the present disclosure there is provided a machine, for example an internal combustion engine, compressor, a linear actuator or a vacuum pump having one or more cylinders. Each cylinder has an inner surface configured to engage at least a portion of a circumferential surface of a piston ring of a piston. In the context of the present disclosure, the term "engage" is intended to encompass two surfaces which are separated by a thin film of lubricant, as well as surfaces which come into direct physical contact. The portion of the piston ring that engages the inner surface defines a contact zone between the inner surface of the cylinder and the circumferential surface of the piston ring. The contact zone has a dimension in the direction of travel of the piston, for example an axial dimension that defines the overall length of the contact zone in the direction of travel of the piston. The inner surface has at least one recess indented into the inner surface. The recess has a dimension in the direction of travel of the piston, for example an axial dimension that defines the overall length of the recess in the direction of travel of the piston. The dimension of the recess in the direction of travel of the piston may be less than the dimension of the contact zone in the direction of travel of the piston. The ratio of the dimension of the recess in the direction of travel of the piston to the dimension of the contact zone in the direction of travel of the piston may be in the range of approximately 1:5 to 3:5. For example, the circumferential surface of the piston ring, and/or the contact zone, may have a dimension of approximately 100 μm to 300 μm in the direction of travel of the piston. The recess may have a maximum dimension of approximately 60 μm in the direction of travel of the piston. In this manner, the recess may be configured so that the circumferential surface of the piston ring, and/or the contact zone, covers, i.e. completely spans, an opening of a recess to prevent a lubricant from leaking out of the recess.

The inner surface of the cylinder and at least a portion of the circumferential surface of a piston ring may be parallel in the contact zone, for example during operation of the engine. The piston ring and/or the inner surface may be configured to deform elastically under loading. The portion of the piston ring that deforms elastically under loading and engages the inner surface of the cylinder may define an elastic contact zone between the inner surface of the cylinder and the circumferential surface of the piston ring. The dimension of the contact zone in the direction of travel of the piston may be defined by the dimension, for example the axial length, of the elastically deformed portion of the piston ring. The circumferential surface of the piston ring and the inner surface of the cylinder may be parallel as a result of the elastic deformation of the piston ring and/or the inner surface. The dimension of the recess in the direction of travel of the piston may be less than the dimension of the elastically deformed portion of the piston ring in the direction of travel of the piston. The ratio of the dimension of the recess in the direction of travel of the piston to the dimension of the elastic contact zone the direction of travel of the piston may be in the range of approximately 1:5 to 3:5.

A lubricant may be used to reduce the friction between the piston ring and the inner surface of the cylinder. A lubricant film may be formed in the contact zone between the circumferential surface of the piston ring and the inner surface of the cylinder during operation of the engine. The lubricant film in between at least a portion of the circumferential surface and the inner surface may have a film thickness that is substantially constant in the direction of travel of the piston during operation of the engine. For example, the film thickness of the lubricant film may be substantially constant where the circumferential surface of the piston ring and the inner surface of the cylinder are parallel. The portion of the lubricant film that has a substantially constant film thickness may have a dimension in the direction of travel of the piston, for example an axial dimension that defines the overall length of the portion of the lubricant film that has a substantially constant film thickness. The dimension of the recess in the direction of travel of the piston may be less than the dimension of the portion of the lubricant film that has a substantially constant film thickness in the direction of travel of the piston. The ratio of the dimension of the recess in the direction of travel of the piston to the dimension of the portion of the lubricant film that has a substantially constant film thickness in the direction of travel of the piston may be in the range of approximately 1:5 to 3:5.

The inner surface may comprise a top region having a plurality of recesses indented into the inner surface. The top region may extend towards the bottom end of the cylinder away from a contact zone between a top piston ring and the inner surface when the piston is at top dead center of a stroke. The inner surface may comprise a bottom region having a plurality of recesses indented into the inner surface. The bottom region may extend towards the top end of the cylinder away from a contact zone between a bottom piston ring and the inner surface when the piston is at bottom dead center of the stroke of the piston. The inner surface may be an inner surface of a bore of a cylinder block. The inner surface may be an inner surface of a cylinder liner.

The recesses may be configured to retain a fluid, for example each recess may comprise a pocket configured to trap the fluid in the inner surface. The recesses may be configured to slow down the rate at which fluid drains away from the top and/or bottom regions of the inner surface. The top region and the bottom region may be separated by a middle region having no recesses indented into the inner surface. The top region and the bottom region may be spaced apart, for example by the middle region, in the direction of travel of the piston.

The top region may comprise a top band of recesses extending around the full circumference of the inner surface. The bottom region may comprise a bottom band of recesses extending around the full circumference of the inner surface. The middle region may comprise a middle band having no recesses extending around the full circumference of the inner surface. The top band may have an axial dimension in the direction of travel of the piston. The bottom band may have an axial dimension in the direction of travel of the piston. The middle band may have an axial dimension in the direction of travel of the piston. The axial dimension of the middle band may be greater than the axial dimension of the top and/or bottom bands.

The contact zone between the piston ring and the inner surface of the cylinder may comprise a region bounded by the circumferential contact between a top edge of the piston ring and the inner surface, and a bottom edge of the piston ring and the inner surface.

The contact zone, for example a top contact zone, between the top piston ring and the inner surface of the cylinder may comprise a region bounded by the circumferential contact between a top edge of the top piston ring and the inner surface, and a bottom edge of the top piston ring and the inner surface when the piston is at top dead center of a stroke.

The contact zone, for example a bottom contact zone, between the bottom piston ring and the inner surface of the cylinder may comprise a region bounded by the circumferential contact between a top edge of the bottom piston ring and the inner surface, and a bottom edge of the bottom piston ring and the inner surface when the piston is at top dead center of a stroke.

The top region may be offset, for example by a predetermined offset distance, from the contact zone between the top piston ring and the inner surface when the piston is at top dead center of a stroke. The top region may be offset from the top contact zone towards the bottom region. The top region may be offset by approximately 1 mm from the contact zone between the top piston ring and the inner surface when the piston is at top dead center of a stroke. The offset distance may be any distance greater than 0 mm. The offset distance may be dependent upon the distance between the top piston ring and the bottom piston ring, e.g. the length of the ring pack.

The bottom region may be offset, for example by a predetermined distance, from the contact zone between the bottom piston ring and the inner surface when the piston is at bottom dead center of a stroke. The bottom region may be offset from the bottom contact zone towards the top region. The bottom region may be offset by approximately 1 mm from the contact zone between the bottom piston ring and the inner surface when the piston is at bottom dead center of a stroke.

The top region may extend from the top edge of the top piston ring when the piston is at top dead center of a stroke. The top region may extend from the bottom edge of the top piston ring when the piston is at top dead center of a stroke. The top region may extend from in between the top and bottom edges of the top piston ring when the piston is at top dead center of a stroke.

The bottom region may extend from the top edge of the bottom piston ring when the piston is at bottom dead center of a stroke. The bottom region may extend from the bottom edge of the bottom piston ring when the piston is at bottom dead center of a stroke. The bottom region may extend from in between the bottom and top edges of the bottom piston ring when the piston is at bottom dead center of a stroke. The top region and the bottom region may extend towards each other.

According to another aspect of the present disclosure there is provided a method of designing, forming or manufacturing a machine. The machine comprises one or more cylinders. Each cylinder has an inner surface configured to engage at least a portion of a circumferential surface of a piston ring of a piston. The term "engage" is intended to encompass two surfaces which are separated by a thin film of lubricant, as well as surfaces which come into direct physical contact. The portion of the piston ring that engages the inner surface defines a contact zone between the inner surface of the cylinder and the circumferential surface of the piston ring. The contact zone has a dimension in the direction of travel of the piston, for example an axial dimension that defines the overall length of the contact zone. The inner surface has at least one recess indented into the inner surface. The method comprises determining the dimension of the contact zone the direction of travel of the piston. The method may comprise designing, forming and/or manufacturing the recess so that the dimension of the recess in the direction of travel of the piston is less than the dimension of the contact zone the direction of travel of the piston. The method may comprise designing, forming and/or manufacturing the recess so that the ratio of the dimension of the recess in the direction of travel of the piston to the dimension of the contact zone the direction of travel of the piston may be in the range of approximately 1:5 to 3:5.

According to an aspect of the present disclosure there is provided a machine, for example an internal combustion engine, compressor, a linear actuator or a vacuum pump having one or more cylinders. Each cylinder has an inner surface configured to engage at least a portion of a circumferential surface of a piston ring of a piston. The inner surface has at least one recess indented into the inner surface. The recess may have a circumferential dimension, for example a dimension in the circumferential direction that defines the overall size of the recess in the circumferential direction. The recesses may be arranged into rows that extend circumferentially around the inner surface. The recesses of each row may have a circumferential spacing between adjacent recesses. The rows may be adjacent rows. The ratio of the dimension of the recess in the circumferential direction to the dimension of the circumferential spacing may be approximately 2:1. One of the rows of recesses may be offset from another of the rows of recesses in the circumferential direction by an offset distance. The ratio of the dimension of the recess in the circumferential direction to the dimension of the offset distance may be approximately 2:1.

According to another aspect of the present disclosure there is provided a method of designing, forming or manufacturing a machine. The machine comprises one or more cylinders. Each cylinder has an inner surface configured to engage at least a portion of a circumferential surface of a piston ring of a piston. The inner surface has at least one recess indented into the inner surface. The recess may have a circumferential dimension, for example a dimension in the circumferential direction that defines the overall size of the recess in the circumferential direction. The recesses may be arranged into rows that extend circumferentially around the inner surface. The rows may be adjacent rows. The recesses of each row may have a circumferential spacing between adjacent recesses. The method may comprise designing, forming and/or manufacturing the recess so that the ratio of the dimension of the recess in the circumferential direction to the dimension of the circumferential spacing may be approximately 2:1. One of the rows of recesses may be offset from another of the rows of recesses in the circumferential direction by an offset distance. The method may comprise designing, forming and/or manufacturing the recess so that the ratio of the dimension of the recess in the circumferential direction to the dimension of the offset distance may be approximately 2:1.

According to another aspect of the present disclosure there is provided an engine having one or more cylinders. Each of the cylinders has an inner surface configured to engage one or more piston rings of an engine piston. The inner surface may comprise a top region having a plurality of recesses indented into the inner surface. The top region may extend towards the bottom end of the cylinder away from a contact zone between a top piston ring and the inner surface when the piston is at top dead center of a stroke. The inner surface may comprise a bottom region having a plurality of recesses indented into the inner surface. The bottom region may extend towards the top end of the cylinder away from a contact zone between a bottom piston ring and the inner surface when the piston is at bottom dead center of the stroke of the piston.

According to another aspect of the present disclosure there is provided a method of manufacturing an engine. The engine comprises one or more cylinders. Each cylinder has an inner surface configured to engage one or more piston rings of an engine piston. The method may comprise providing a plurality of recesses indented into a top region of the inner surface. The top region may extend towards the bottom end of the cylinder away from a contact zone between a top piston ring and the inner surface when the piston is at top dead center of a stroke. The method may comprise providing a plurality of recesses indented into a bottom region of the inner surface. The bottom region may extend towards the top end of the cylinder away from a contact zone between a bottom piston ring and the inner surface at bottom dead center of the stroke of the piston.

According to another aspect of the present disclosure there is provided a bearing interface of an apparatus, for example a rotary machine such as an engine, compressor, vacuum pump or gear box, or a linear actuator. The apparatus has a first element and a second element. The first element may be configured to move, for example slide and/or rotate, relative to the second element during operation of the apparatus. The second element may be configured to move, for example slide and/or rotate, relative to the first element during operation of the apparatus. The first element may be fixed, for example stationary, relative to the second element during operation of the apparatus. The second element may be fixed, for example stationary, relative to the first element during operation of the apparatus. The first element comprises a first bearing surface. The second element comprises a second bearing surface. The first and second bearing surfaces are configured to engage each other. The term "engage" is intended to encompass two surfaces which are separated by a thin film of lubricant, as well as surfaces which come into direct physical contact. The first bearing surface is configured to engage at least a portion of a second bearing surface. The portion of the second element that engages the first element defines a contact zone between the first bearing surface and the second bearing surface. The first bearing surface has at least one recess, for example a pocket, indented into the first bearing surface. The recess may comprise an opening in the first bearing surface. The dimension of the recess, for example the dimension of the opening of the recess, in the direction of movement of the second element relative to the first element is less than the dimension of the contact zone in the direction of movement of the second element.

The first bearing surface and at least the portion of the second bearing surface may be parallel in the contact zone during operation of the apparatus. The second bearing surface may be configured to deform elastically upon engagement with the first bearing surface. The dimension of the contact zone in the direction of movement of the second element may be defined by the dimension of the elastically deformed portion of the second bearing surface in the direction of movement of the second element. The dimension of the recess in the direction of movement of the second element may be less than the dimension of the elastically deformed portion of the second bearing surface in the direction of movement of the second element. The ratio of the dimension of the recess in the direction of movement of the second element to the dimension of the contact zone the direction of movement of the second element may be in the range of approximately 1:5 to 3:5.

According to another aspect of the present disclosure there is provided a method of designing, forming or manufacturing a bearing interface of an apparatus, for example a rotary machine such as an engine, compressor, vacuum pump or gearbox, or a linear actuator. The apparatus comprises a first element and a second element. The first element may be configured to move, for example slide and/or rotate, relative to the second element during operation of the apparatus. The second element may be configured to move, for example slide and/or rotate, relative to the first element during operation of the apparatus. The first element may be fixed, for example stationary, relative to the second element during operation of the apparatus. The second element may be fixed, for example stationary, relative to the first element during operation of the apparatus. The first element comprises a first bearing surface. The second element comprises a second bearing surface. The first and second bearing surfaces are configured to engage each other. The first bearing surface is configured to engage at least a portion of a second bearing surface. The portion of the second bearing surface that engages the first bearing surface defines a contact zone between the first bearing surface and the second bearing surface. The first bearing surface has at least one recess, for example a pocket, indented into the first bearing surface. The recess may comprise an opening in the first bearing surface. The method comprises determining the dimension of the contact zone the direction of movement of second element. The method may comprise designing, forming and/or manufacturing the recess so that the dimension of the recess in the direction of movement of second element is less than the dimension of the contact zone the direction of movement of second element. The method may comprise designing, forming and/or manufacturing the recess so that the ratio of the dimension of the recess in the direction of movement of the second element to the dimension of the contact zone the direction of movement of the second element may be in the range of approximately 1:5 to 3:5.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 8 shows a detailed view of a plurality of recess.

DETAILED DESCRIPTION

Figure 1:
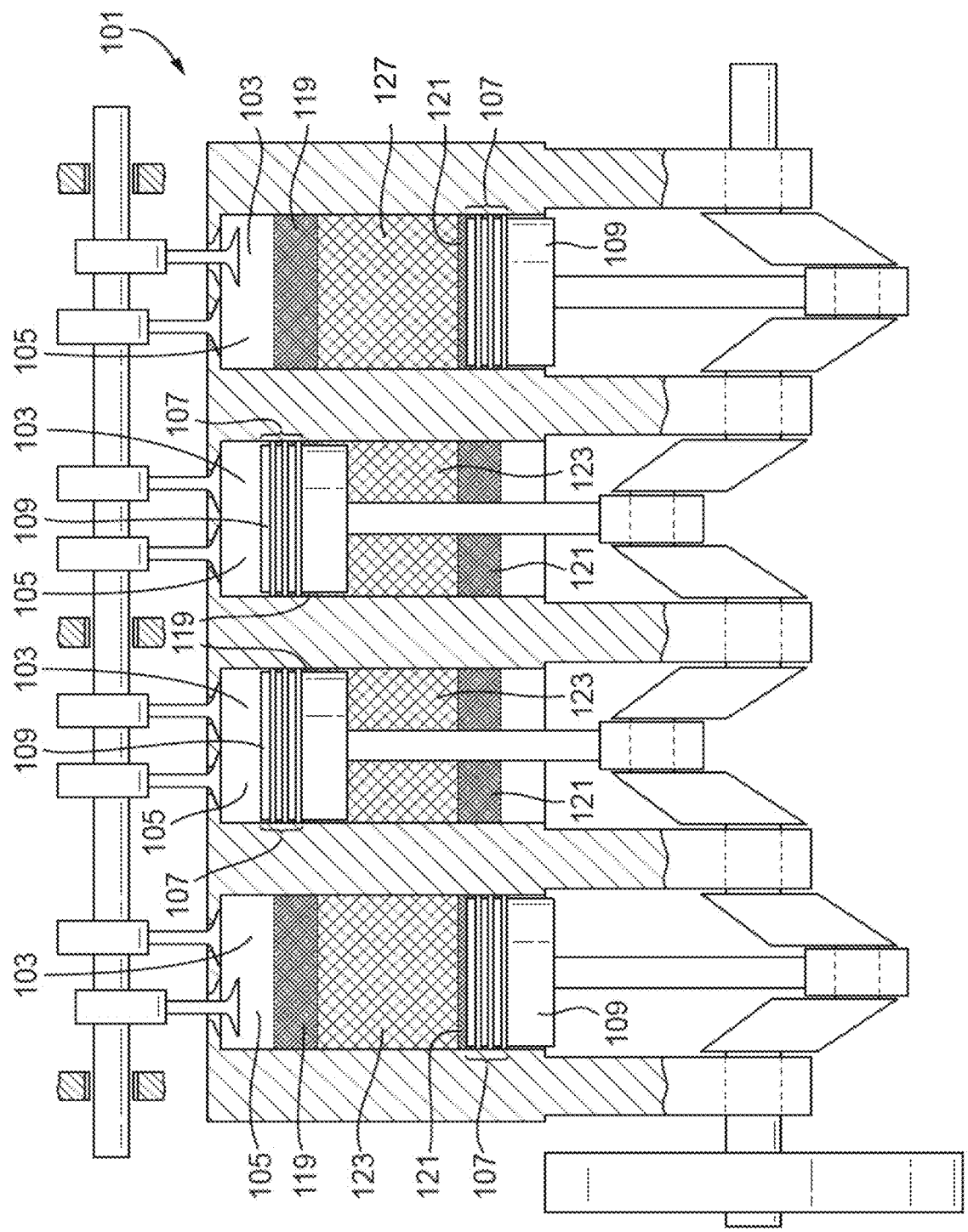
FIG. 1 shows a partial cross section through an engine.

FIG. 1 shows a simplified cross-section of a machine in the form of an engine 101. The engine 101 is a four-cylinder engine having an overhead camshaft. However, the engine 101 may be any type of engine, for example a single overhead camshaft (SOHC) engine, a double overhead camshaft (DOHC) engine, an overhead valve (OHV) engine, or other appropriate type of engine. While the engine 101 shown in FIG. 1 is a four-cylinder engine, the engine 101 may comprise any appropriate number of cylinders 103, for example the engine 101 may be a three-cylinder engine, a six-cylinder engine or an eight-cylinder engine. The cylinders 103 may be arranged in an appropriate configuration, such as in-line, horizontally opposed or V-form.

Figure 2:
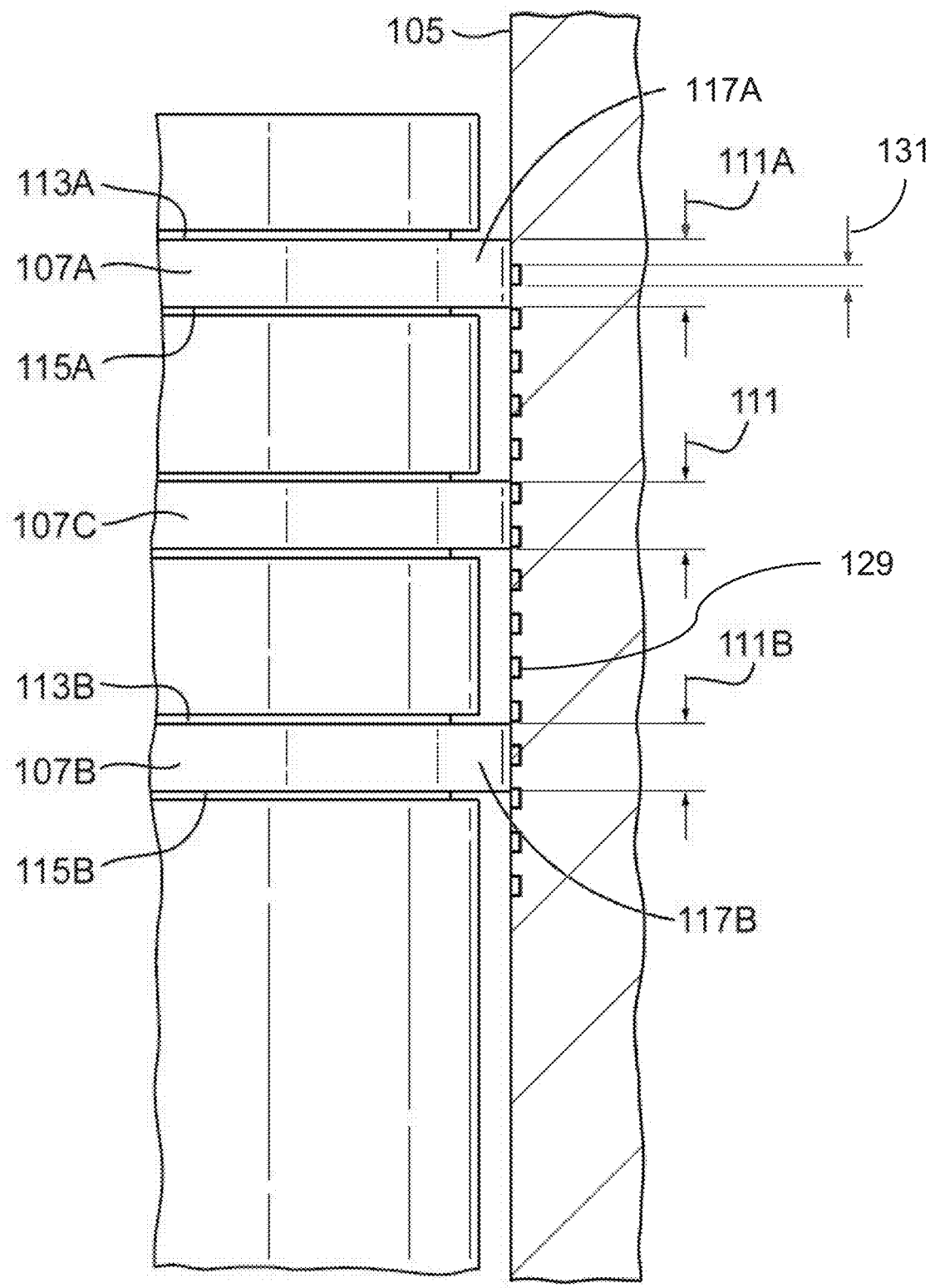
FIG. 2 shows a detailed view of the piston rings of an engine piston.
Figure 3:
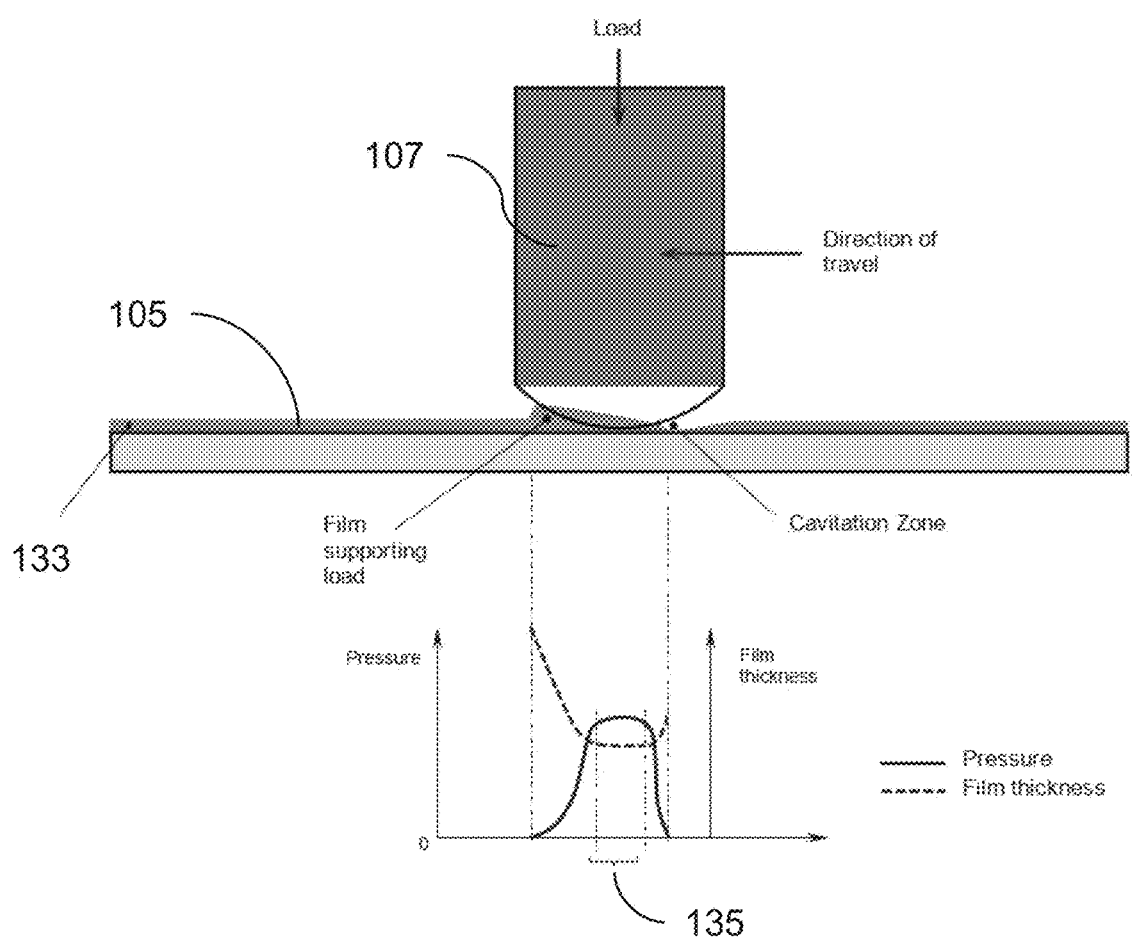
FIG. 3 shows a diagrammatic representation of a fluid film between a piston ring and an inner surface of a cylinder.

Each of the cylinders 103 comprises an inner surface 105 configured to engage the piston rings 107 of an engine piston 109. The inner surface 105 may be an inner surface of a cylinder bore formed directly into a cylinder block of the engine 101, as shown in FIGS. 1 to 3. Alternatively, the inner surface 105 may be an inner surface of a cylinder liner that is assembled into the cylinder block.

During operation of the engine 101, each of the pistons 109 reciprocates within the cylinder 103 between a top dead center position and a bottom dead center position. In the context of the present disclosure, the term "top dead center" refers to the furthest point of a piston's travel, at which it changes from an upward stroke, i.e. away from a crankshaft of the engine 101, to a downward stroke, i.e. towards the crankshaft of the engine 101. The term "bottom dead center" refers to the furthest point of a piston's travel, at which it changes from a downward to an upward stroke. In a similar manner, the term "top" end of the cylinder 103 refers to an end of the cylinder 103 at which the piston 109 reaches top dead center, and the term "bottom" end of the cylinder 103 refers to an end of the cylinder 103 at which the piston 109 reaches bottom dead center.

During the operation of the engine 101, the linear speed of the piston 109 varies between a minimum speed, for example a zero speed when the piston is stationary relative to cylinder 103 at top dead center or bottom dead center, and a maximum speed as the piston 109 moves between top center and bottom dead center. As a result of the change in speed of the piston 109, the coefficient of friction between the piston rings 107 and the inner surface 105 of the cylinder varies as the piston 109 travels within the cylinder bore.

In order to reduce the friction between the sliding components of the engine 101, such as the piston rings 107 and the inner surface 105 of the cylinder, a lubricant may be used. The frictional coefficient between sliding components may be determined using the Stribeck curve, which is used to categorize the frictional properties between two surfaces as a function of the viscosity of the lubricant and the relative speed between the components per unit load. Friction may be minimized by operating at the minimum point on the Stribeck curve, which defines the tribological transition between hydrodynamic lubrication and mixed lubrication. However, it is difficult to maintain operation at the minimum point on the Stribeck curve across the full piston stroke as a result of the cyclical acceleration and deceleration of the piston 109. For example, it is difficult to maintain hydrodynamic lubrication towards the top and bottom ends of the piston stroke owing to the low relative speeds between the piston 109 and the cylinder 103. In particular, at the ends of the travel of the piston 109, where the piston speed drops to zero, a lubricant film between the piston rings 107 and the inner surface 105 of the cylinder 103 can collapse as there is no motion to form a hydrodynamic lubricant film. The collapse of the film is dependent on how fast the lubricant can drain away from a contact zone 111 between the piston rings 107 and the inner surface 105 of the cylinder 103.

FIG. 2 shows a detailed view of the contact zones 111, 111A, 111B between the piston rings 107 and the inner the surface 105 of the cylinder 103. In the arrangement shown in FIGS. 1 to 3, the piston 109 has a top piston ring 107A and a bottom piston ring 107B. However, the piston 109 may have any appropriate number of piston rings 107, for example the piston 109 of FIGS. 1 to 3 has a middle piston ring 107C. Each of the piston rings 107 may be configured to perform a different function, for example top piston ring 107A may be a compression ring configured to provide a seal between the top and bottom of the cylinder 103 on either side of the piston 109, and the bottom piston ring 107B may be and oil scraper ring configured to remove oil from the inner surface 105 of the cylinder 103.

In the arrangement shown in FIG. 2, the top and bottom piston rings 107A, 107B each comprise a circumferential surface 117A, 117B configured to engage the inner surface 105 of the cylinder 103. The piston rings 107 are axially aligned with the piston 109 such that the circumferential surfaces 117A, 117B substantially engage the inner surface 105 of the cylinder 103. In this manner, the contact zone 111A between the top piston ring 107A and the inner surface 105 of the cylinder 103 is defined by a region bounded by the circumferential contacts between a top edge 113A of the top piston ring 107A and the inner surface 105, and a bottom edge 115A of the top piston ring 107A and the inner surface 105. In a similar manner, the contact zone 111B between the bottom piston ring 107B and the inner surface 105 of the cylinder 103 comprises a region bounded by the circumferential contacts between a top edge 113B of the bottom piston ring 107B and the inner surface 105, and a bottom edge 115B of the bottom piston ring 107B and the inner surface 105. However, in a different arrangement, the piston rings 107 may be configured such that only a portion of the or each circumferential surface 117A, 117B engages the inner surface 105 of the cylinder 103. For example the circumferential surfaces 117A, 117B may comprise one or more ribs/projections that extend at least partially around the circumference of the piston rings 107. It is understood therefore that the contact zone between any one of the piston rings 107 may be defined by the portion of the circumferential surface of the piston ring 107 that engages the inner surface 105 of the cylinder 103.

The inner surface 105 of the cylinder 103 comprises a top region 119 located towards the top end of the cylinder 103 and a bottom region 121 located towards the bottom end of the cylinder 103. Each of the top and bottom regions 119, 121 may comprise a plurality of recesses 129 indented into the inner surface 105. The recesses 129 may comprise any type opening in the inner surface 105 that enables a fluid, such as a lubricant, to be held within the opening as the piston ring 107 moves over the opening. For example, the recesses 129 may comprise a plurality of pockets shaped to retain lubricant, and/or decrease the rate at which lubricant drains away from the contact zones. The pockets may be of any shape, for example the pockets may be square, rectangular, circular or any other shape. In one arrangement, the pockets may be of a similar shape to each other. In another arrangement, the plurality of pockets may comprise a number of differently formed/shaped pockets, for example the plurality of pockets may comprise a number of round-bottomed pockets and a number of square-bottomed pockets that are configured to trap lubricant.

For the pockets to be effective, lubricant needs to be restricted from "leaking" out of the pocket as the piston ring 107 travels over it. This can be achieved by having a contact zone 111, 111A, 111B that is larger than an opening 131 of the recess 129 in the direction of travel of the piston 109. In FIG. 2, each of the piston rings 107 has a circumferential surface that has a straight/flat profile such that the circumferential surface is substantially parallel to the inner surface 105 during operation of the engine. In such an arrangement, the dimension of the contact zone 111, 111A, 111B in the direction of travel of the piston 109 may be defined by the dimension between the top and bottom edges of the piston ring 107. In order to prevent the lubricant from leaking out of the pocket, the pocket may be designed such that the overall dimension 131 of the pocket in the direction of travel of the piston 109 is less than the dimension between the top and bottom edge of the piston ring 107.

However, the circumferential surface may have a curved profile, for example a barreled profile. The dimension of the contact zone 111, 111A, 111B in the direction of travel of the piston 109 may be defined by the size, e.g., axial length, of an elastic contact zone between the inner surface and a portion of the circumferential surface of the piston ring 107 that deforms elastically under loading. For example, the dimension of the contact zone 111, 111A, 111B in the direction of travel of the piston 109 may be defined by a portion of the curved profile that deforms elastically to provide a portion of the circumferential surface that is parallel with the inner surface 105 of the cylinder 103. The size of the elastic contact zone may be dependent upon the radial loading of the piston ring 107 against the inner surface 105, the shape/form of the circumferential surface of the piston ring 107, and/or the material properties, e.g. the Young's modulus, of the respective surfaces. In order to prevent the lubricant from leaking out of the pocket, the pocket may be designed such that the overall dimension 131 of the pocket in the direction of travel of the piston 109 is less than the dimension of the elastic contact zone in the direction of travel of the piston.

During operation of the engine, a lubricant film 133 may be formed between the circumferential surface of the piston ring 107 and the inner surface 105 of the cylinder 103, for example as a result of the motion between the respective surfaces. FIG. 3 shows a diagrammatic representation of the lubricant film 133 between the piston ring 107 and the inner surface 105 of the cylinder 103 as the piston ring 107 moves relative to the inner surface 105. The lubricant film 133 has a film thickness that is a function of the shape of the circumferential surface of the piston ring 107, the velocity gradient between the piston ring 107 and the inner surface 105, the shear stress in the lubricant, the dynamic viscosity of the lubricant, and/or the radial loading of the piston ring 107. In FIG. 3, the thickness of the lubricant film 133 varies between a maximum thickness in a convergence zone in front of the piston ring 107 and a minimum thickness in a divergence zone behind the piston ring 107, for example where the film 133 cavitates. In FIG. 3, the piston ring 107 is a barreled piston ring having a curved circumferential surface that deforms elastically under loading, which results in a portion of the circumferential surface being parallel with the inner surface 105 of the cylinder 103. As a result, the lubricant film 133 has a portion 135 of constant film thickness in the region where the circumferential surface is parallel with the inner surface 105. In order to prevent the lubricant from leaking out of the pocket, the pocket may be designed such that the overall dimension 131 of the pocket in the direction of travel of the piston 109 is less than the length of the portion 135 of the lubricant film 133 that has a constant film thickness.

By trapping lubricant, it is possible to ensure that the lubrication regime remains hydrodynamic and prevents contact between the piston rings 107 and the inner surface 105 of the cylinder 103, for example in those regions of the inner surface 105 where the speed of the piston 109 approaches zero. However, in those regions of the inner surface 105 where the speed of the piston 109 is high, for example mid stroke of the piston 109, the provision of recesses may act to increase the coefficient of friction as a hydrodynamic film may already be established due to the high relative speeds between the piston rings 107 and surface 105 of the cylinder 103. It is desirable therefore to provide recesses in regions of the inner surface 105 only where the relative speeds between piston rings 107 and the inner surface 105 approach zero, for example where the piston 109 is at top dead center and bottom dead center of the piston stroke.

Figure 4:
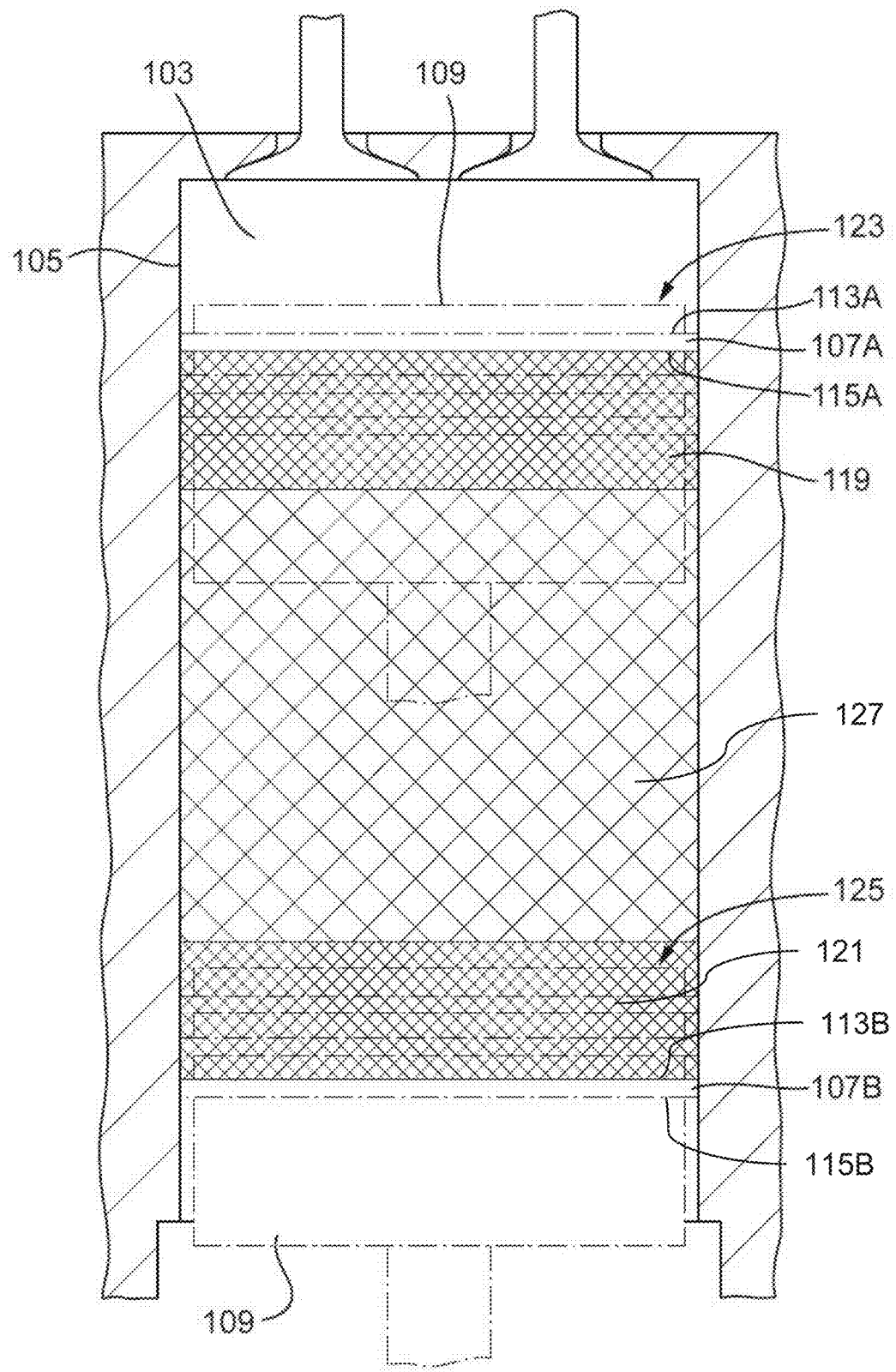
FIG. 4 shows a cylinder of an engine.

FIG. 4 shows a schematic view of the cylinder 103 having the piston 109 in a first position 123 at top dead center and in a second position 125 at bottom dead center. The top region 119 of the inner surface 105 extends towards the bottom end of the cylinder 103 away from the contact zone 111A between the top piston ring 107A and the inner surface 105 when the piston 109 is at top dead center of a stroke. In the arrangement shown in FIG. 4, the top region 119 extends from the bottom edge 115A of the top piston ring 107A when the piston 109 is at top dead center. However, the top region 119 may extend from any portion of the contact zone 111A between the top piston ring 107A and the inner surface 105 when the piston 109 is at top dead center of a stroke. For example, the top region 119 may extend from the top edge 113A of the top piston ring 107A, or from any point in between the top and bottom edges 113A, 115A when the piston 109 is at top dead center. In another arrangement, the top region 119 may be offset, for example towards the bottom region 121, from the contact zone 111A between the top piston ring 107A and the inner surface 105 when the piston 109 is at top dead center of a stroke. It is appreciated therefore that in each of the above-mentioned arrangements, the top region 119 does not extend beyond the extent of travel of the top piston ring 107A, and that the plurality of recesses are not provided beyond the extent of travel of the top piston ring 107A when the piston 109 is at top dead center of a stroke.

The bottom region 121 extends towards the top end of the cylinder 103 away from the contact zone 111B between the bottom piston ring 107B and the inner surface 105 when the piston 109 is at bottom dead center of a stroke. In the arrangement shown in FIG. 4, the bottom region 121 extends from the top edge 113B of the bottom piston ring 107B when the piston 109 is at bottom dead center. However, the bottom region 121 may extend from any portion of the contact zone 111B between the bottom piston ring 107B and the inner surface 105 when the piston 109 is at bottom dead center of a stroke. For example, the bottom region 121 may extend from the bottom edge 115B of the bottom piston ring 107B, or from any point in between the top and bottom edges 113B, 115B when the piston 109 is at bottom dead center. In another arrangement, the bottom region 121 may be offset, for example towards the top region 119, from the contact zone 111B between the bottom piston ring 107B and the inner surface 105 when the piston 109 is at bottom dead center of a stroke. It is appreciated therefore that in each of the above-mentioned arrangements, the bottom region 121 does not extend beyond the extent of travel of the bottom piston ring 107B, and that the plurality of recesses are not provided beyond the extent of travel of the bottom piston ring 107B when the piston 109 is at bottom dead center of a stroke.

The inner surface 105 of the cylinder 103 may comprise a middle region 127 in between the top and bottom regions 119, 121. The middle region 127 may be proximate to the top and bottom regions 119, 121, or may be spaced apart and separate from the top and bottom regions 119, 121. The middle region 127 may provide a region of the inner surface that has no recesses configured to trap fluid, for example the middle region 127 of the inner surface 105 may be a smooth surface that separates the top and bottom regions 119, 121. The middle region may be provided across the majority of the inner surface 105, with the top and bottom regions being provided towards the top and bottom ends of the inner surface. The inner surface 105 of the cylinder 103 may, therefore, be configured to provide discrete regions 119, 121 that are configured to prevent the lubrication regime from transitioning into boundary lubrication from hydrodynamic lubrication in the regions of the piston stroke where the speed of the piston 109 approaches zero. In this manner, the coefficient of friction is minimized by maintaining a lubrication regime that operates near to the minimum of the Stribeck curve during operation of the engine.

Figure 5:
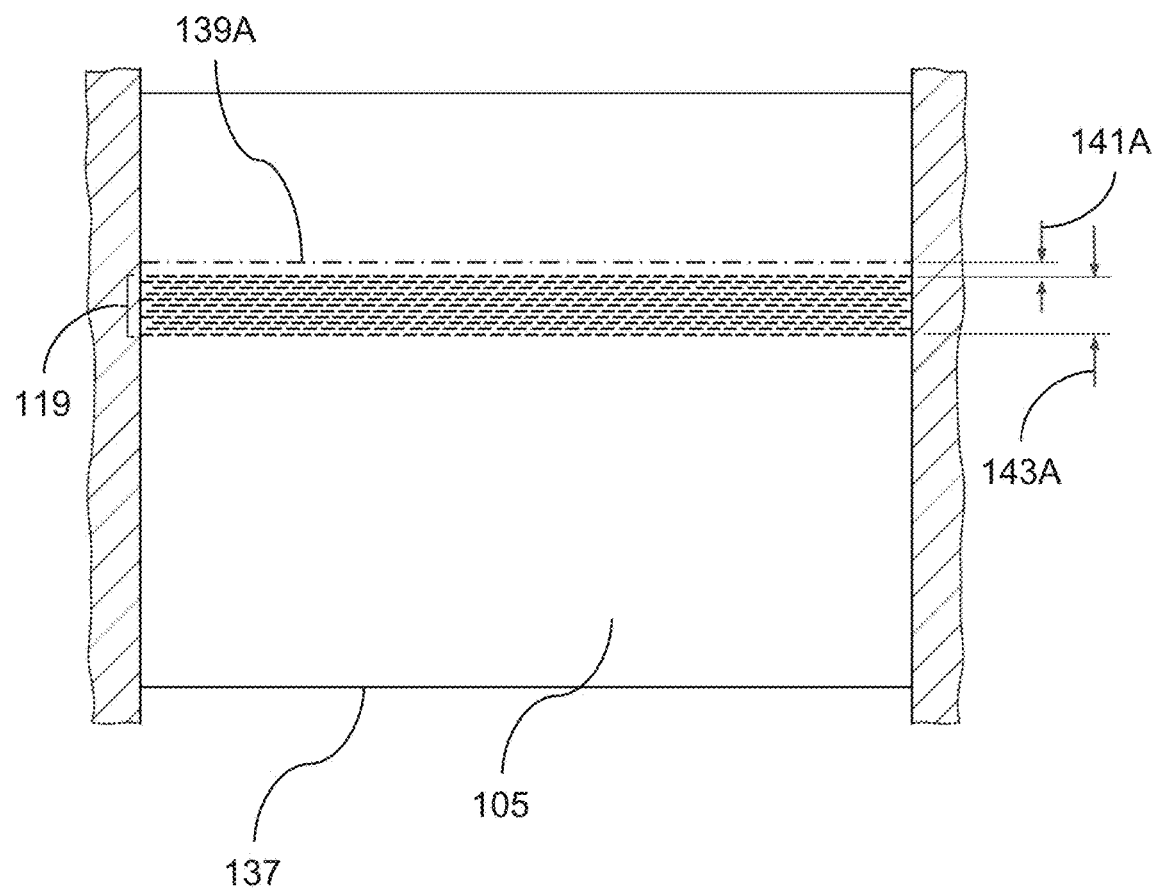
FIG. 5 shows an inner surface of a cylinder liner.

FIG. 5 shows a cylinder liner 137 for the cylinder 103 of an engine. The cylinder liner 137 comprises the inner surface 105 having the top region 119 extending towards the bottom end of the cylinder 103 away from the contact zone 111A between the top piston ring 107A and the inner surface 105 when the piston 109 is at top dead center of a stroke.

Line 139A on FIG. 5 represents the bottom edge 115A of the top piston ring 107A when the piston 109 is at top dead center. The top region 119 is offset from the bottom edge 115A of the top piston ring 107A when the piston 109 is at top dead center by an offset distance 141A in the direction of the travel of the piston 109. The offset distance 141A may be approximately 1 mm, or within the range of approximately 0.5 to 1.5 mm. The top region 119 extends by a distance 143A in the direction of the travel of the piston 109. The distance 143A may be approximately 20 mm. The top region may extend towards the bottom end of the cylinder 103 away from the contact zone 111A such that the top region extends further than the bottom edge 115B of the bottom ring 107B when the piston 109 is at the top dead center. For example, when the piston 109 is at top dead center, one or more recesses 129 may be provided in a region of the inner surface 105 below the bottom edge 115B of the bottom ring 107B. The distance 143A may be greater than the distance between the top edge 113A of the top piston ring 107A and the bottom edge 115B of the bottom piston ring 107B, or in other words, the distance 143A may be greater than the overall height of the ring pack.

Where the piston ring 107, for example the top piston ring 107A, has a barreled or curved profile, the top region 119 may be offset from the bottom edge of the elastic contact zone 135.

Figure 6:
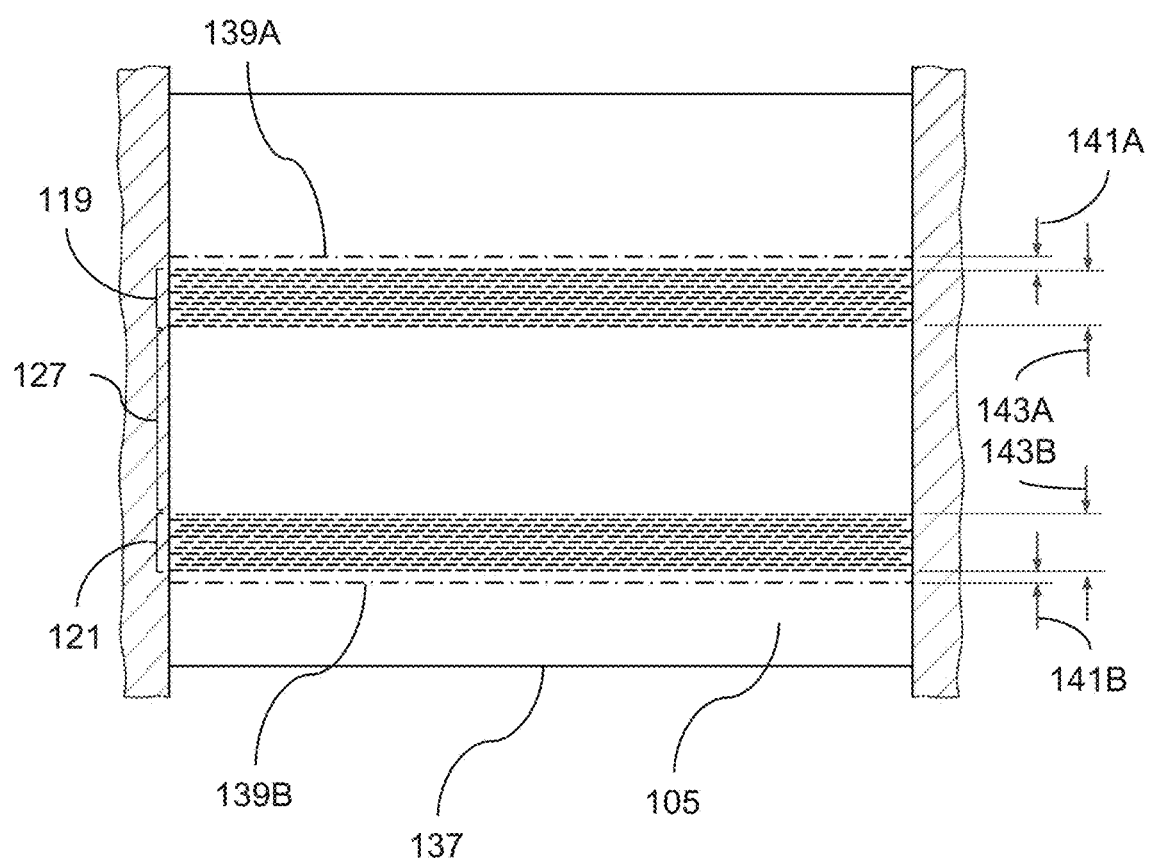
FIG. 6 shows an inner surface of another cylinder liner.

FIG. 6 shows the cylinder liner 137 for the cylinder 103 of an engine. The cylinder liner 137 comprises the inner surface 105 having: the top region 119 extending towards the bottom end of the cylinder 103 away from the contact zone 111A between the top piston ring 107A and the inner surface 105 when the piston 109 is at top dead center of a stroke; the bottom region 121 extending towards the top end of the cylinder 103 away from the contact zone 111B between the bottom piston ring 107B and the inner surface 105 when the piston 109 is at bottom dead center of a stroke; and the middle region 127 which has no recesses and separates the top and bottom regions 119, 121.

Line 139A on FIG. 6 represents the bottom edge 115A of the top piston ring 107A when the piston 109 is at top dead center and line 139B represents the top edge 113B of the bottom piston ring 107B when the piston 109 is at top dead center. The top region 119 is offset from the bottom edge 115A of the top piston ring 107A when the piston 109 is at top dead center by an offset distance 141A in the direction of the travel of the piston 109, and the bottom region 121 is offset from the top edge 113B of the bottom piston ring 107B when the piston 109 is at bottom dead center by an offset distance 141B in the direction of the travel of the piston 109. The offset distances 141A and 141B may each be approximately 1 mm, or within the range of approximately 0.5 to 1.5 mm. The offset distances 141A and 141B may be the same distance or may be different distances depending upon the operational requirements of the top and bottom regions 119, 121. The top region 119 extends by a distance 143A in the direction of the travel of the piston 109. The distance 143A may be approximately 20 mm. The top 119 region may extend towards the bottom end of the cylinder 103 away from the contact zone 111A such that the top region 119 extends further than the bottom edge 115B of the bottom ring 107B when the piston 109 is at the top dead center. For example, when the piston 109 is at top dead center, one or more recesses 129 may be provided in a region of the inner surface 105 below the bottom edge 115B of the bottom ring 107B. The distance 143A may be greater than the distance between the top edge 113A of the top piston ring 107A and the bottom edge 115B of the bottom piston ring 107B, or in other words, the distance 143A may be greater than the overall height of the ring pack.

The bottom region 121 extends by a distance 143B in the direction of the travel of the piston 109. The distances 143A and 143B may each be approximately 20 mm. The bottom region 121 may extend towards the top end of the cylinder 103 away from the contact zone 111B such that the bottom region 121 extends further than the top edge 113A of the top ring 107A when the piston 109 is at the bottom dead center. For example, when the piston 109 is at bottom dead center, one or more recesses 129 may be provided in a region of the inner surface 105 above the top edge 113A of the top ring 107A. The distance 143B may be greater than the distance between the bottom edge 115B of the bottom piston ring 107B and the top edge 113A of the top piston ring 107A, or in other words, the distance 143B may be greater than the overall height of the ring pack.

The distance 143A and 143B by which each of the top and bottom regions 119, 121 extends along the length of the inner surface 105 may be the same distance, or may be different distances depending upon the operational requirements of the top and bottom regions 119, 121. The middle region 127 may extend by any appropriate distance in the direction of travel of the piston 109, depending on the overall travel of the piston and the distances 143A, 143B by which the top and bottom regions extend along the inner surface 105 respectively.

Figure 7:
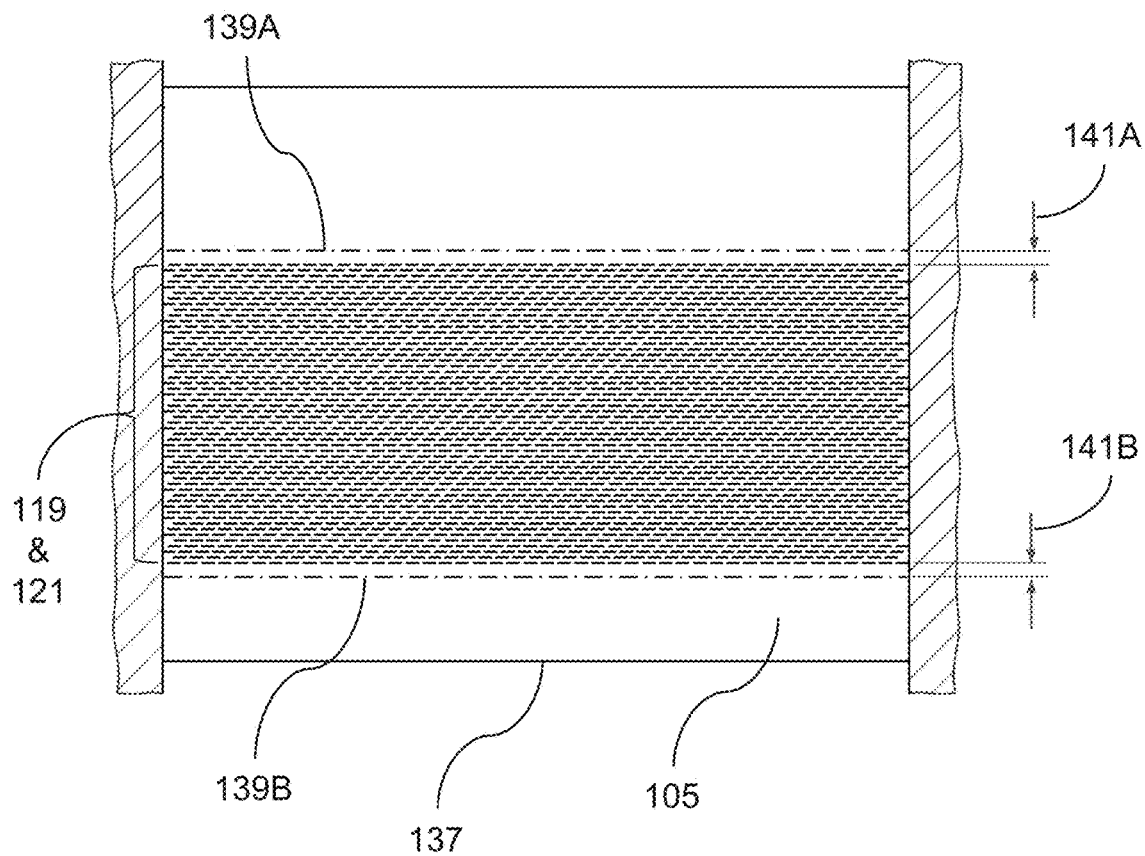
FIG. 7 shows an inner surface of a further cylinder liner.

FIG. 7 shows the cylinder liner 137 for the cylinder 103 of an engine. The cylinder liner 137 comprises the inner surface 105 having: the top region 119 extending towards the bottom end of the cylinder 103 away from the contact zone 111A between the top piston ring 107A and the inner surface 105 when the piston 109 is at top dead center of a stroke; and the bottom region 121 extending towards the top end of the cylinder 103 away from the contact zone 111B between the bottom piston ring 107B and the inner surface 105 when the piston 109 is at bottom dead center of a stroke.

Line 139A on FIG. 7 represents the bottom edge 115A of the top piston ring 107A when the piston 109 is at top dead center and line 139B represents the top edge 113B of the bottom piston ring 107B when the piston 109 is at top dead center. The top region 119 is offset from the bottom edge 115A of the top piston ring 107A when the piston 109 is at top dead center by an offset distance 141A in the direction of the travel of the piston 109, and the bottom region 121 is offset from the top edge 113B of the bottom piston ring 107B when the piston 109 is at bottom dead center by an offset distance 141B in the direction of the travel of the piston 109. The offset distances 141A and 141B may each be approximately 1 mm, or within the range of approximately 0.5 to 1.5 mm. The offset distances 141A and 141B may be the same distance or may be different distances depending upon the operational requirements of the top and bottom regions 119, 121. The top and bottom regions 119, 121 extend along the inner surface 105 to the point where the top and bottom regions 119, 121 meet, and the inner surface 105 does not have a middle section 127 disposed between the top and bottom regions 119, 121.

FIG. 8 shows a detailed view of the plurality of recesses 129 shown in FIGS. 5 to 7. In the arrangement of FIG. 8, each of the recesses has the same configuration. However, as mentioned above, the plurality of recesses 129 may comprise any appropriate combination of differently shaped/formed recesses 129. In the arrangement shown in FIG. 8, the recesses 129 each have: a length 145, for example a circumferential length; a width 131, for example a width in the direction of travel of the piston 109; and a depth, for example a depth by which the recess 129 is indented into the inner surface 105. The length 145 of the recess 129 may be approximately 4 mm, or within the range of approximately 2 mm to 6 mm. The width 131 of the recess 129 may be approximately 60 μm, or within the range of approximately 20 μm to 100 μm. The depth of the recess 129 may be approximately 5 μm, or within the range of approximately 3 μm to 10 μm.

The recesses 129 may be spaced apart from each other in circumferential direction and/or in the direction of the travel of the piston, i.e. an axial direction. The recesses 129 may be spaced apart from each other in circumferential direction by a distance 150, which may be approximately 2 mm, or within the range of approximately 1 mm to 3 mm. The recesses 129 may be spaced apart from each other in axial direction by a distance 149, which may be approximately 2 mm, or within the range of approximately 1 mm to 3 mm.

In FIG. 8, the recesses 129 are arranged into rows 151 that are spaced apart in the axial direction by the distance 149. In each row, the recesses 129 are spaced apart from each other in circumferential direction by a distance 150, such that recesses 129 of each row 151 form a discontinuous ring around the circumference of the inner surface 105. Each row 151 may be staggered relative to an adjacent row 151. For example, each row 151 may have an angular offset about the longitudinal axis of the cylinder 103, such that the recesses 129 of adjacent rows 151A, 151B, 151C are spaced apart from each other in circumferential direction by a distance 147, which may be approximately 2 mm, or within the range of approximately 1 mm to 3 mm.

In the arrangement shown in FIG. 8, the ratio of the recess length 145 to the stagger distance 147 is approximately 2:1, and the ratio of the recess length 145 to the circumferential spacing 150 between rows 151 is approximately 2:1. In this manner, the recesses 129 are arranged such that the recess pattern repeats every third row 151. For example, any particular portion of the circumferential surface 117 of the piston ring 109 will travel over the recesses 129 in the sequence of "recess, recess, no recess, etc." In this manner, the hydrodynamic effect of the lubricant retained in the recesses 129 is evenly distributed around the circumferential surface 117 of the piston ring 107.

The circumferential length 145 of each recess 129 may be selected to limit the amount of lubricant leakage at a ring gap of the piston ring 107. For example, a piston ring 107 typically has a ring gap to allow the ring 107 to be assembled onto the piston 109, and to account for, amongst other factors, changes in the dimensions of the ring 107 owing to thermal expansion during operation of the engine. The ring gap may be a gap of approximately 0.25 mm to 0.75 mm in the circumferential surface 117 of the piston ring 107. Where the piston gap travels over the recess 129, the piston ring 107 is unable to seal over a recess 129 and, as a result, lubricant can leak out of the recess. By limiting the circumferential length 145 of each recess 129, the volume of lubricant that may leak from a recess 129 is minimized while maintaining a sufficient volume of lubricant in the recess 129 to produce the desired hydrodynamic effect.

In certain circumstances, the recesses 129 may be misaligned, for example as a result of manufacturing tolerances. As stated above, the recesses 129 may have any appropriate shape; while the design intent may be to produce recesses 129 that have circumferential edges that parallel with a radial plane of the cylinder 103, the manufactured recesses 129 may have a skewed or twisted shape. For example, the method of manufacturing the recesses 129 may comprise using a laser whose beam is rotated and translated at the same time to create a screw thread form, thereby resulting a recess 129 having edges that are inclined to a radial plane of the cylinder 103. Further, there may be some misalignment between the top and bottom edges of the piston ring 107. As a result, the contact zone 111 may be defined by the engagement between only a portion of the circumferential surface 117 and the inner surface 105. It is understood, therefore, that the contact zone 111, 111A, 111B and/or the elastic contact zone 135 must have an overall dimension in the direction of travel of the piston 109 that is greater than the overall dimension of the recess 129 in the direction of travel of the piston 109.

The Figures show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. A machine having one or more cylinders, each cylinder having an inner surface configured to engage at least a portion of a circumferential surface of a piston ring of a piston, the inner surface having a plurality of recesses indented into the inner surface, each recess having a circumferential dimension, the recesses being arranged into a row that extends circumferentially around the inner surface, the recesses of the row having a circumferential spacing between an adjacent recess, and the recesses being formed in two separate regions, wherein a ratio of a dimension of each recess in a direction of travel of the piston to a dimension of a contact zone in the direction of travel of the piston is in a range of 1:5 to 3:5.

2. The machine according to claim 1, wherein the recesses are arranged into a plurality of rows, wherein the rows are adjacent rows, wherein one of the rows of recesses is offset from another of the rows of recesses in a circumferential direction by an offset distance; wherein a ratio of a dimension of the recess in the circumferential direction to a dimension of the offset distance is between 6 and ⅔.

3. A machine having one or more cylinders, each cylinder having an inner surface configured to engage at least a portion of a circumferential surface of a piston ring of a piston, the inner surface having a plurality of recesses indented into the inner surface, each recess having a circumferential dimension, the recesses being arranged into a row that extends circumferentially around the inner surface, wherein an engagement between the circumferential surface of the piston ring of the piston and the inner surface defines a contact zone between the inner surface of the cylinder and the circumferential surface of the piston ring, wherein a ratio of a dimension of each recess in a direction of travel of the piston to a dimension of the contact zone in the direction of travel of the piston is in a range of 1:5 to 3:5.

4. The machine according to claim 3, wherein the inner surface of the cylinder and at least the portion of the circumferential surface of the piston ring are parallel in the contact zone during operation of the machine, wherein the recesses are provided in a bore of a cylinder block or in a bore of a cylinder liner.

5. The machine according to claim 3, wherein the circumferential surface of the piston ring is configured to deform elastically upon engagement with the inner surface of the cylinder, the dimension of the contact zone in the direction of travel of the piston being defined by a dimension of an elastically deformed portion of the circumferential surface of the piston ring in the direction of travel of the piston.

6. The machine according to claim 5, wherein the dimension of each recess in the direction of travel of the piston is less than the dimension of the elastically deformed portion in the direction of travel of the piston.

7. The machine according to claim 3, wherein a film of lubricant is provided in the contact zone between the circumferential surface of the piston ring and the inner surface of the cylinder during operation of the machine, a portion of the film of lubricant having a film thickness that is constant in the direction of travel of the piston during operation of the machine.

8. The machine according to claim 7, wherein the dimension of each recess in the direction of travel of the piston is less than a dimension of the film of lubricant in the direction of travel of the piston.

9. The machine according to claim 3, wherein the inner surface comprises at least one of:

a top region having the plurality of the recesses indented into the inner surface, wherein the top region extends towards a bottom end of the cylinder away from a contact zone between a top piston ring and the inner surface when the piston is at top dead center of a stroke; and a bottom region having the plurality of recesses indented into the inner surface, wherein the bottom region extends a top end of the cylinder away from a contact zone between a bottom piston ring and the inner surface when the piston is at bottom dead center of a stroke.

10. The machine according to claim 9, wherein the top region and the bottom region are separated by a middle region having no recesses indented into the inner surface, wherein the top region and the bottom region are spaced apart in the direction of travel of the piston, wherein the top region is offset from the contact zone between the top piston ring and the inner surface when the piston is at top dead center of a stroke.

11. The machine according to claim 10, wherein the top region is offset from the contact zone between the top piston ring and the inner surface when the piston is at top dead center of a stroke by a distance of 0.5 to 1.5 mm.

12. The machine according to claim 9, wherein the bottom region is offset from the contact zone between the bottom piston ring and the inner surface when the piston is at bottom dead center of a stroke.

13. The machine according to claim 12, wherein the bottom region is offset from the contact zone between the bottom piston ring and the inner surface when the piston is at bottom dead center of a stroke by a distance of 0.5 to 1.5 mm.

14. The machine according to claim 9, wherein the contact zone between the top piston ring and the inner surface of the cylinder comprises a region bounded by a circumferential contact between a top edge of the top piston ring and the inner surface, and a bottom edge of the top piston ring and the inner surface when the piston is at top dead center of a stroke, wherein the top region extends from in between the top and bottom edges of the top piston ring when the piston is at top dead center of a stroke.

15. The machine according to claim 9, wherein the contact zone between the bottom piston ring and the inner surface of the cylinder comprises a region bounded by a circumferential contact between a top edge of the bottom piston ring and the inner surface, and a bottom edge of the bottom piston ring and the inner surface when the piston is at top dead center of a stroke, wherein the bottom region extends from in between the bottom and top edges of the bottom piston ring when the piston is at bottom dead center of a stroke.

16. The machine according to claim 15, wherein the top region extends in the direction of travel of the piston by a distance greater than a distance between a top edge of the top piston ring and the bottom edge of the bottom piston ring.

17. The machine according to claim 15, wherein the bottom region extends in the direction of travel of the piston by a distance greater than a distance between the bottom edge of the bottom piston ring and a top edge of the top piston ring, wherein the top region and the bottom region extend towards each other.

18. The machine according to claim 9, wherein the top region extends from a top edge of the top piston ring when the piston is at top dead center of a stroke, or wherein the top region extends from a bottom edge of the top piston ring when the piston is at top dead center of a stroke.

19. The machine according to claim 9, wherein the bottom region extends from a top edge of the bottom piston ring when the piston is at bottom dead center of a stroke, or wherein the bottom region extends from a bottom edge of the bottom piston ring when the piston is at bottom dead center of a stroke.

20. A method of forming a machine, the machine having one or more cylinders, each cylinder having an inner surface configured to engage at least a portion of a circumferential surface of a piston ring of a piston, the inner surface having a plurality of recesses indented into the inner surface, each recess having a circumferential dimension, the recesses being arranged into a row, wherein the recesses of the row have a circumferential spacing between an adjacent recess, the method comprising:

selecting a ratio of a dimension of the recess in a circumferential direction to a dimension of the circumferential spacing;

forming a row of recesses that extends circumferentially around the inner surface, and wherein a ratio of a dimension of each recess in a direction of travel of the piston to a dimension of a contact zone in the direction of travel of the piston is in a range of 1:5 to 3:5, the contact zone being defined by an engagement between the piston ring and the inner surface.

* * * * *